(12) United States Patent
Robert et al.

(10) Patent No.: US 7,205,360 B2
(45) Date of Patent: Apr. 17, 2007

(54) PREPARATION PROCESS FOR BLOCK COPOLYMERS FOR TIRE TREAD COMPOSITIONS, AND SUCH COPOLYMERS

(75) Inventors: Pierre Robert, Perignat-les-Sarlieves (FR); Jean-Michel Favrot, Cournon-d'Auvergne (FR); Pierre Lesage, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 348 days.

(21) Appl. No.: 10/835,409

(22) Filed: Apr. 30, 2004

(65) Prior Publication Data

US 2004/0260002 A1 Dec. 23, 2004

(51) Int. Cl.
*C08F 297/02* (2006.01)
*C08K 3/36* (2006.01)

(52) U.S. Cl. .............. 525/314; 525/105; 525/249; 525/250; 524/572; 524/573; 526/176; 526/177; 526/340.2; 152/209.1; 152/905

(58) Field of Classification Search ........... 525/249, 525/250, 314, 105; 526/176, 177, 340.2; 524/572, 573; 152/209.1, 905
See application file for complete search history.

(56) References Cited

U.S. PATENT DOCUMENTS

| | | | |
|---|---|---|---|
| 4,092,268 A * | 5/1978 | de Zarauz | 502/153 |
| 4,302,568 A | 11/1981 | Bingham et al. | |
| 4,307,218 A | 12/1981 | Bingham et al. | |
| 4,341,886 A | 7/1982 | Freppel | |
| 4,503,204 A | 3/1985 | Bingham et al. | |
| 5,070,148 A * | 12/1991 | Hsu et al. | 525/316 |
| 5,134,199 A | 7/1992 | Hattori et al. | |
| 6,703,448 B2 | 3/2004 | Pierre et al. | |

FOREIGN PATENT DOCUMENTS

| | | |
|---|---|---|
| EP | 0 441 485 | 8/1991 |
| EP | 0 438 967 | 5/1996 |
| EP | 1 018 521 | 7/2000 |
| EP | 1 092 733 | 4/2001 |
| FR | 2 294 186 | 7/1976 |
| GB | 1 516 861 | 7/1978 |
| GB | 1 525 381 | 9/1978 |

OTHER PUBLICATIONS

Shimada et al. "Manufacture of conjugated diene polymers", STN Chemical Abstract XP002113272; Copyright 1999 ACS.

* cited by examiner

*Primary Examiner*—Fred Teskin
(74) *Attorney, Agent, or Firm*—Buchanan Ingersoll & Rooney PC

(57) ABSTRACT

A preparation process for a copolymer having two blocks usable in a sulphur-cross-linkable rubber composition of reduced hysteresis in the cross-linked state, such a block copolymer in which one of the blocks is a polyisoprene and the other a diene elastomer other than a polyisoprene, and this rubber composition for tire treads. A process for the preparation of this copolymer involves copolymerizing one or more monomers including a conjugated diene other than isoprene using a catalytic system including at least one hydrocarbon solvent, a compound A of a metal of group IIIA, a compound B of an alkaline-earth metal and a polymeric initiator C having a C—Li bond which is constituted of a monolithiated polyisoprene intended to form the polyisoprene block, the number-average molecular weight $M_{n1}$ of the polyisoprene block being between 2,500 and 20,000 g/mol. A copolymer is obtained in which the block composed of the diene elastomer has a number-average molecular weight $M_{n2}$ of between 65,000 and 350,000 g/mol and a content of trans-1,4 linkages equal to or greater than 70%.

30 Claims, No Drawings

PREPARATION PROCESS FOR BLOCK COPOLYMERS FOR TIRE TREAD COMPOSITIONS, AND SUCH COPOLYMERS

The present invention relates to a preparation process for a block copolymer usable in a sulphur-cross-linkable rubber composition of reduced hysteresis in the cross-linked state, such a block copolymer and such a rubber composition which is usable in a tyre tread. The invention also relates to such a tread and a tyre incorporating it, which has reduced rolling resistance.

The tyre industry is constantly endeavouring to reduce the hysteresis of mixtures in order to limit fuel consumption and thus conserve the environment.

This reduction in hysteresis must be achieved while maintaining or even improving the processability of the mixtures. Numerous approaches for reducing hysteresis have already been investigated. Chain end functionalisation has attracted particular attention.

Most of the suggested methods have involved seeking out adjacent functions on completion of polymerisation which are capable of interacting with carbon black, for example contained in star polymers or tin-coupled polymers. European Patent Specification EP-A-709 235 may be mentioned by way of example. Other functions which interact with carbon black have also been attached to chain ends, such as 4,4'-bis(diethylaminobenzophenone), which is also known as DEAB, or other amine functions. By way of example, mention may be made of patent specifications FR-A-2 526 030 and U.S. Pat. No. 4,848,511.

Some years ago, it became possible to use silica and research has been under way to find functions capable of interacting with this filler. Patent specification FR-A-2 740 778, which discloses for example functions comprising a silanol group, may in particular be mentioned in this connection. Mention may also be made of specification U.S. Pat. No. 5,066,721, which discloses alkoxysilane or aryloxysilane functions, or also specification U.S. Pat. No. 3,244,664.

Most of these approaches, whether for carbon black or for silica, bring about a genuine reduction in hysteresis and an increased level of reinforcement in the corresponding compositions. Unfortunately, it is also generally the case that these improvements result in greater difficulty in processing these compositions.

Other means of reducing hysteresis which do not affect the processing of the mixtures have thus been sought.

In particular, using polymers with a low hysteresis potential, in particular polyisoprene, has appeared to be a promising approach. However, directly using this type of polymer does not always provide a satisfactory compromise between dynamic modulus and hysteresis.

In order to overcome this disadvantage, the attempt has been made to use block copolymers comprising a polyisoprene block.

Block copolymers are generally composed of materials in segregated phases. Diblock polyisoprene/polystyrene copolymers, the synthesis of which has been comprehensively described in the literature, may be mentioned by way of example. These diblock copolymers are known to exhibit valuable impact resistance properties.

Block copolymers comprising polyisoprene and polybutadiene blocks (respectively abbreviated to IR and BR) have also been described in the literature.

Certain post-polymerisation reactions convert these elastomers into thermoplastic materials. For example, when hydrogenating a triblock BR/IR/BR copolymer, the butadiene fraction forms a crystalline polyethylene, while the isoprene fraction gives rise to a rubbery ethylene/butylene type material.

Hydrochlorination of these materials may also impart crystalline properties thereto.

Diblock IR/SBR copolymers (polyisoprene/copolymer of stirene and butadiene) have been described in European Patent Specification EP-A-438 967 in relation to a reinforcing filler specifically comprising carbon black. The number-average molecular weight of the IR block is preferably of between 70,000 and 150,000 g/mol, and that of the SBR block is preferably of between 220,000 and 240,000 g/mol. Furthermore, the ratio of the number-average molecular weight of the IR block to that of the SBR block must be greater than 33% and may be as much as 300%.

The rubber compositions described in this document may be of a variable structure, which is lamellar when said ratio is of the order of 33%, and spherical when said ratio is of the order of 300%.

However, for all these values of said ratio of from 33% to 300%, it should be noted that the relatively high number-average molecular weight of the IR block always results in marked segregation of the phases corresponding respectively to the IR and SBR blocks, owing to the high contents of 1,4-linkages for the IR block.

IR/BR block copolymers have also been considered as compatibilising agents for blends of polyisoprene and polybutadiene.

The paper by D. J. Zanzig, F. L. Magnus, W. L. Hsu, A. F. Halasa, M. E. Testa, Rubber Chemistry and Technology vol. 66, pp. 538–549 (1993), which mentions the use of IR/BR block copolymers containing 80% or 50% IR, may be mentioned in this connection. At these relative amounts, the number-average molecular weight of the IR block is always equal to or greater than 200,000 g/mole, and as a result the blocks of these copolymers also form segregated phases.

Mention may also be made in this connection of the paper by R. E. Cohen, A. R. Ramos, Macromolecules Vol. 12, No. 1, 131–134 (1979). In this paper, the diblock copolymers used have IR blocks of a number-average molecular weight equal to 104,000 g/mol, or equal to 133,000 g/mol. The relatively high molecular weight of the IR blocks and the BR blocks also results in great segregation of the phases relating to these two blocks.

The Applicant has recently surprisingly discovered that a catalytic system comprising at least one hydrocarbon solvent, a compound A of a metal of group IIIA, a compound B of an alkaline-earth metal and a polymeric initiator C comprising a C—Li bond which is formed of a monolithiated polyisoprene obtained anionically makes it possible to prepare, by copolymerisation of one or more monomers comprising a conjugated diene other than isoprene, a copolymer, whether functional or not, having two blocks, which is such that:

one of said blocks consists of of a polyisoprene (IR) formed from said polymeric initiator C, the other block consists of a diene elastomer the molar ratio of units originating from conjugated dienes of which is greater than 15% and which has a content of trans-1,4 linkages equal to or greater than 70%, and the number-average molecular weight $M_{n1}$ of the IR block is of between 2,500 and 20,000 g/mol, the number-average molecular weight $M_{n2}$ of the other block consisting of said diene elastomer being of between 65,000 and 350,000 g/mol, the copolymer thus obtained being usable in a sulphur-cross-linkable rubber composition and making it possible to optimise significantly for this composition, in the cross-linked state, the results of the reduction in hysteresis and, in the non-cross-linked state, the results of processing ability.

In particular, taking as reference the hysteresis relating to "control" diene elastomers the molar ratio of units originating from conjugated dienes of which is greater than 15%, such as a stirene/butadiene copolymer (SBR), a copolymer having two blocks according to the invention, such as an IR/SBR copolymer, is characterised by a hysteresis which is lower than that relating to this "control" elastomer.

It will be noted that this reduced molecular weight of the polyisoprene block makes it possible not to reduce the modulus of the block copolymer obtained too significantly.

Preferably, the ratio of said number-average molecular weights $M_{n1}/M_{n2}$ is substantially between 5 and 20%.

A diene elastomer the molar ratio of units originating from conjugated dienes of which is greater than 15% (i.e. an "essentially unsaturated" diene elastomer) which is capable of forming said block other than said polyisoprene block is understood to mean any homopolymer obtained by polymerisation of a conjugated diene monomer other than isoprene having 4 to 12 carbon atoms, or any copolymer obtained by copolymerisation of one or more dienes conjugated together or with one or more vinyl aromatic compounds having from 8 to 20 carbon atoms.

Suitable conjugated dienes are, in particular, 1,3-butadiene, 2,3-di(C1 to C5 alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 1,3-pentadiene and 2,4-hexadiene.

Suitable vinyl aromatic compounds are, in particular, stirene, ortho-, para- or meta-methylstirene, the commercial mixture "vinyl-toluene", para-tert.butylstirene, the methoxy-stirenes or vinyl mesitylene.

As regards said catalytic system which is used to prepare the block copolymers according to the invention, mention may be made, as representative examples of said compounds A which are usable, of the following organometallic compounds:

organoaluminium compounds, whether halogenated or not, such as triethylaluminium, triisobutylaluminium, diethylaluminium chloride, ethylaluminium dichloride, ethylaluminium sesquichloride or methylaluminium sesquichloride; dialkylaluminium hydrides, such as diethylaluminium hydride, diisobutylaluminium hydride, etc.

Preferably, a trialkylaluminium the number of carbon atoms of which is from 1 to 12, advantageously trioctylaluminium, is used for said compound A.

As representative examples of the compounds B used, mention may be made of the following compounds of barium or strontium:

the hydrides $H_2Ba$ and $H_2Sr$, mono- or polyfunctional organic acid salts of formulae $(R-COO)_2$ Ba or Sr, $R_1-(COO)_2$ Ba or Sr, in which R and $R_1$ are organic radicals, the former being monovalent and the latter divalent, the corresponding thioacids, the mono- or polyfunctional alcoholates and the corresponding thiolates; the mono- or polyfunctional phenates and the corresponding thiophenates; barium or strontium salts of hydroxyacids and of phenolic acids and the corresponding thio-products; barium or strontium β-diketonates such as the reaction products of barium or of strontium with acetylacetone, dibenzoylmethane, thenoyltrifluoroacetone, benzoyltrifluoroacetone or benzoylacetone; organic barium or strontium derivatives such as those of 1,1-diphenylethylene, 1,2-acenaphthylene, tetraphenylbutane, α-methylstirene, or alternatively those such as diphenylbarium or -strontium, bis(cyclopentadienyl)barium or -strontium, trialkylsilylbarium or -strontium, or triphenylsilylbarium or -strontium; mixed organic derivatives such as phenylbarium iodide, methylstrontium iodide, barium or strontium salts of secondary amines; ketyl metals such as barium or strontium benzophenone, barium or strontium cinnamone and the corresponding alkylated products and also the sulphurised homologues; radical ions of barium and strontium such as those of naphthalene, anthracene, chrysene, diphenyl, etc.

It is also possible to use a calcium alcoholate for the compound B.

Preferably, a barium alcoholate, advantageously barium ethyl diglycolate or barium nonylphenoxide, is used for said compound B.

According to a first embodiment of the invention, this catalytic system according to the invention is constituted by a co-catalyst, resulting from the reaction product in said hydrocarbon solvent of said compound A and said compound B, and by said initiator C.

According to a first example of embodiment of this first mode, the preparation process according to the invention consists of implementing the following steps:

in a first step, said co-catalyst prepared is prepared by reacting the two metallic compounds A and B in said inert hydrocarbon solvent. Then the mixture obtained is heated preferably to a temperature of between 20° C. and 120° C., even more preferably between 30° C. and 50° C., and for a time sufficient to permit the reaction of the two compounds A and B. This duration is generally between 1 and 60 minutes, preferably between 20 and 40 minutes; then in a second step, said co-catalyst is contacted with the polymerisation medium comprising said monomer(s) which are to be copolymerised (which are for example dissolved in a polymerisation solvent, in the case of copolymerisation in solution), with the exclusion of said polymeric initiator C; then in a third step, said initiator C is added to the polymerisation medium thus obtained, so as to react the mixture obtained in said second step, and later the polymerisation reaction for obtaining said polymers is stopped, in order to obtain a copolymer, whether functional or not, which is then recovered as is known per se.

According to a second example of embodiment of this first embodiment, the preparation process according to the invention then consists of implementing the following steps:

a first step which is the same as that described for said first example; then a second step which consists of adding said polymeric initiator C to the pre-mixture obtained in the first step formed by compounds A and B, possibly after having added an alkyl lithium compound to improve the activity of the catalytic system. Preferably, this alkyllithium compound is butyllithium.

a third step which consists of adding the catalytic system thus obtained to the polymerisation medium comprising said monomer(s) to be copolymerised (which are for example dissolved in a polymerisation solvent, in the case of copolymerisation in solution) and later stopping the polymerisation, in order to obtain a copolymer, whether functional or not, according to the invention.

The temperature conditions are the same as those of said first example.

According to a second embodiment of the invention, said catalytic system is constituted by a pre-mixture of said compounds A and C in said hydrocarbon solvent and by said compound B.

More precisely, this pre-mixture containing the compounds A and C is added to the polymerisation medium comprising said monomer(s) to be copolymerised (which are for example dissolved in a polymerisation solvent, in the case of copolymerisation in solution), then said compound B is added to all this and the polymerisation is later stopped, in order to obtain a copolymer, whether functional or not, according to the invention.

In these two embodiments of the preparation process according to the invention, a quantity of the reagents A and B is used such that the molar ratio A/B is of between 0.5 and 5, and preferably between 2.5 and 4. Furthermore, a quantity of the two reagents B and C is used which is such that the molar ratio C/B is of between 0.2 and 4, and preferably between 1.5 and 4.

Furthermore, in the case of copolymerisation in solution, the polymerisation solvent is preferably a hydrocarbon solvent, preferably cyclohexane, and the polymerisation temperature is between 20° C. and 150° C., and preferably between 60° C. and 110° C.

Furthermore, the concentration of alkaline-earth metal of the catalytic system according to the invention is between 0.01 and 0.5 mol·l$^{-1}$, preferably between 0.03 and 0.25 mol·l$^{-1}$.

It will be noted that the polymerisation according to the invention may be continuous, discontinuous and that is may also be effected without solvent.

According to another characteristic of the invention, the polyisoprene block (IR) of the copolymer according to the invention has a number of vinyl linkages (3,4 and 1,2) which is substantially between 1 and 20%.

Advantageously, styrene and butadiene are used as monomers to be copolymerised with the polyisoprene present in said lithiated initiator C, to obtain a copolymer having two blocks IR and SBR (polyisoprene/stirene/butadiene).

Equally preferably, the block of the copolymer according to the invention which is formed of said diene elastomer other than a polyisoprene, for example an SBR block, comprises a function which is capable of interacting with a reinforcing filler.

It will be noted that the reduction in hysteresis is still more marked in this case and that it is accompanied by an improvement in processability, compared with conventional functionalised elastomers.

This function may be capable of interacting with a reinforcing inorganic filler, such as silica, and it may for example comprise a silanol group or a mono-, di- or tri-alkoxysilane group.

This function may also be capable of interacting with carbon black, and it may for example comprise a C—Sn bond.

In this latter case, this function may be obtained as is known per se by reaction with a functionalising agent of organohalotin type which may correspond to the general formula $R_3SnCl$, or with a coupling agent of organodihalotin type which may correspond to the general formula $R_2SnCl_2$, or with a starring agent of the organotrihalotin type which may correspond to the general formula $RSnCl_3$, or of tetrahalotin type which may correspond to the formula $SnCl_4$ (where R is an alkyl, cycloalkyl or aryl radical).

Said function capable of interacting with carbon black may also comprise an amine group.

A rubber composition according to the invention, which is adapted to have an improved processing ability in the non-cross-linked state and a reduced hysteresis in the cross-linked state, is such that its elastomeric matrix comprises a block copolymer according to the invention as defined above, the block of said copolymer formed of said diene elastomer other than a polyisoprene being functionalised, coupled or starred for bonding to said reinforcing filler.

This reinforcing filler comprises for example a majority portion of a reinforcing inorganic filler (that is to say in a mass fraction which is greater than 50%).

In the present application, "reinforcing inorganic filler", in known manner, is understood to mean an inorganic or mineral filler, whatever its colour and its origin (natural or synthetic), also referred to as "white" filler or sometimes "clear" filler in contrast to carbon black, this inorganic filler being capable, on its own, without any other means than an intermediate coupling agent, of reinforcing a rubber composition intended for the manufacture of tyres, in other words which is capable of replacing a conventional tyre-grade carbon black filler in its reinforcement function.

Preferably, all or at the very least a majority proportion of the reinforcing inorganic filler is silica ($SiO_2$). The silica used may be any reinforcing silica known to the person skilled in the art, in particular any precipitated or pyrogenic silica having a BET surface area and a specific CTAB surface area both of which are less than 450 m$^2$/g, even if the highly dispersible precipitated silicas are preferred.

In the present specification, the BET specific surface area is determined in known manner, in accordance with the method of Brunauer, Emmett and Teller described in "The Journal of the American Chemical Society", vol. 60, page 309, February 1938, and corresponding to Standard AFNOR-NFT-45007 (November 1987); the CTAB specific surface area is the external surface area determined in accordance with the same Standard AFNOR-NFT-45007 of November 1987.

"Highly dispersible silica" is understood to mean any silica having a very substantial ability to disagglomerate and to disperse in an elastomeric matrix, which can be observed in known manner by electron or optical microscopy on thin sections. As non-limitative examples of such preferred highly dispersible silicas, mention may be made of the silica Perkasil KS 430 from Akzo, the silica BV3380 from Degussa, the silicas Zeosil 1165 MP and 1115 MP from Rhodia, the silica Hi-Sil 2000 from PPG, the silicas Zeopol 8741 or 8745 from Huber, and treated precipitated silicas such as, for example, the aluminium-"doped" silicas described in patent specification EP-A-735088.

The physical state in which the reinforcing inorganic filler is present is immaterial, whether it be in the form of a powder, microbeads, granules or alternatively balls. Of course, "reinforcing inorganic filler" is also understood to mean mixtures of different reinforcing inorganic fillers, in particular of highly dispersible silicas such as described above.

It will be noted that the reinforcing filler of a rubber composition according to the invention may contain in a blend (mixture), in addition to the aforementioned reinforcing inorganic filler or fillers, carbon black in a minority proportion (that is to say, in a mass fraction of less than 50%). Suitable carbon blacks are any carbon blacks, in particular the blacks of type HAF, ISAF and SAF, which are conventionally used in tyres, and particularly in tyre treads. As non-limitative examples of such blacks, mention may be made of the blacks N115, N134, N234, N339, N347 and N375.

For example, black/silica blends or blacks partially or entirely covered with silica are suitable to form the reinforcing filler.

Also suitable as reinforcing inorganic fillers are carbon blacks modified by silica, such as, although this is not limiting, the fillers sold by CABOT under the name "CRX 2000", which are described in International Patent Specification WO-A-96/37547.

According to another example of embodiment of the composition of the invention, said reinforcing filler comprises carbon black in a majority proportion.

As carbon black, there are suitable all the aforementioned blacks which are commercially available or conventionally used in tyres and particularly in treads, and also black/silica blends, carbon blacks partially or integrally covered with silica, or said carbon blacks modified by silica.

According to one variant embodiment of the invention, said reinforcing filler comprises a blend of 50% reinforcing inorganic filler and 50% carbon black.

It is well-known to the person skilled in the art that it is necessary to use, for a reinforcing inorganic filler such as, for example, a silica or a reinforcing alumina, an (inorganic filler/elastomer) coupling agent, also referred to as a bonding agent, the role of which is to produce the bond or "coupling" between the inorganic filler and the elastomer, while facilitating the dispersion of this inorganic filler within the elastomeric matrix.

"Coupling agent" is more precisely understood to mean an agent capable of establishing a sufficient chemical and/or physical connection between the filler in question and the elastomer, while facilitating the dispersion of this filler within the elastomeric matrix; such a coupling agent, which is at least bifunctional, has, for example, the simplified general formula "Y-T-X", in which:

Y represents a functional group ("Y" function) which is capable of bonding physically and/or chemically with the inorganic filler, such a bond being able to be established, for example, between a silicon atom of the coupling agent and the surface hydroxyl (OH) groups of the inorganic filler (for example, surface silanols in the case of silica);

X represents a functional group ("X" function) which is capable of bonding physically and/or chemically with the elastomer, for example by means of a sulphur atom;

T represents a group making it possible to link Y and X.

The coupling agents must particularly not be confused with simple agents for covering the filler in question which, in known manner, may comprise the Y function which is active with respect to the filler but are devoid of the X function which is active with respect to the elastomer.

Such coupling agents, of variable effectiveness, have been described in a very large number of documents and are well-known to the person skilled in the art. In fact, any coupling agent known to or likely to ensure, in the diene rubber compositions usable for the manufacture of tyres, the effective bonding or coupling between a reinforcing white filler such as silica and a diene elastomer, such as, for example, organosilanes, in particular polysulphurised alkoxysilanes or mercaptosilanes, or alternatively polyorganosiloxanes bearing the X and Y functions mentioned above, may be used.

Silica/elastomer coupling agents in particular have been described in a large number of documents, the best known being bifunctional alkoxysilanes such as polysulphurised alkoxysilanes.

In particular polysulphurised alkoxysilanes, which are referred to as "symmetrical" or "asymmetrical" depending on their specific structure, are used, such as those described for example in patents U.S. Pat. No. 3,842,111, U.S. Pat. No. 3,873,489, U.S. Pat. No. 3,978,103, U.S. Pat. No. 3,997,581, U.S. Pat. No. 4,002,594, U.S. Pat. No. 4,072,701, U.S. Pat. No. 4,129,585, or in the more recent patents U.S. Pat. No. 5,580,919, U.S. Pat. No. 5,583,245, U.S. Pat. No. 5,650,457, U.S. Pat. No. 5,663,358, U.S. Pat. No. 5,663,395, U.S. Pat. No. 5,663,396, U.S. Pat. No. 5,674,932, U.S. Pat. No. 5,675,014, U.S. Pat. No. 5,684,171, U.S. Pat. No. 5,684,172, U.S. Pat. No. 5,696,197, U.S. Pat. No. 5,708,053, U.S. Pat. No. 5,892,085 and EP-A-1 043 357, which describe such known compounds in detail.

Particularly suitable for implementing the invention, without the definition below being limitative, are symmetrical polysulphurised alkoxysilanes which satisfy the following general formula (I):

$$Z\text{-}A\text{-}S_n\text{-}A\text{-}Z, \text{ in which:} \qquad (I)$$

n is an integer from 2 to 8 (preferably from 2 to 5);

A is a divalent hydrocarbon radical (preferably $C_1$–$C_{18}$ alkylene groups or $C_6$–$C_{12}$ arylene groups, more particularly $C_1$–$C_{10}$ alkylenes, notably $C_1$–$C_4$ alkylenes, in particular propylene);

Z corresponds to one of the formulae below:

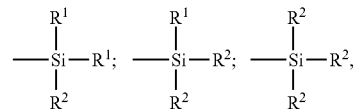

in which:

the radicals $R^1$, which may or may not be substituted, and may be identical or different, represent a $C_1$–$C_{18}$ alkyl group, a $C_5$–$C_{18}$ cycloalkyl group or a $C_6$–$C_{18}$ aryl group, (preferably $C_1$–$C_6$ alkyl groups, cyclohexyl or phenyl, in particular $C_1$–$C_4$ alkyl groups, more particularly methyl and/or ethyl).

the radicals $R^2$, which may or may not be substituted, and may be identical or different, represent a $C_1$–$C_{18}$ alkoxyl group or a $C_5$–$C_{18}$ cycloalkoxyl group (preferably $C_1$–$C_{18}$ alkoxyl groups or $C_5$–$C_8$ cycloalkoxyl groups, more preferably $C_1$–$C_4$ alkoxyl groups, in particular methoxyl and/or ethoxyl).

In the case of a mixture of polysulphurised alkoxysilanes in accordance with Formula (I) above, in particular conventional, commercially available, mixtures, it will be understood that the average value of the "n"s is a fractional number, preferably within a range from 2 to 5.

As polysulphurised alkoxysilanes, mention will be made more particularly of the polysulphides (in particular disulphides, trisulphides or tetrasulphides) of bis-(($C_1$–$C_4$) alkoxyl-($C_1$–$C_4$)alkyl-silyl($C_1$–$C_4$)alkyl), such as for example the polysulphides of bis(3-trimethoxysilylpropyl) or of bis(3-triethoxysilylpropyl). Of these compounds, preferably bis(3-triethoxysilylpropyl) tetrasulphide, abbreviated TESPT, of the formula $[(C_2H_5O)_3Si(CH_2)_3S_2]_2$, or bis(triethoxysilylpropyl) disulphide, abbreviated TESPD, of the formula $[(C_2H_5O)_3Si(CH_2)_3S]_2$, are used. TESPD is sold, for example, by Degussa under the names Si266 or Si75 (in the latter case, in the form of a mixture of disulphide (75% by weight) and of polysulphides), or alternatively by Witco under the name Silquest A1589. TESPT is sold, for example, by Degussa under the name Si69 (or X50S when it is supported to 50% by weight on carbon black), or alternatively by Osi Specialties under the name Silquest A1289 (in both cases, a commercial mixture of polysulphides having an average value of n which is close to 4). Mention will also be made of tetrasulphurised monoalkoxysilanes, such as monoethoxydimethylsilylpropyl tetrasulphide (abbreviated to MESPT), which are the subject of international patent application PCT/EP02/03774 in the name of the applicants.

The person skilled in the art will be able to adjust the content of coupling agent in the compositions of the invention, according to the intended application, the nature of the elastomer used, and the quantity of reinforcing silicon carbide, supplemented if applicable by any other inorganic filler used as complementary reinforcing filler.

The compositions according to the invention contain, in addition to said elastomeric matrix, said reinforcing filler and possibly one or more reinforcing inorganic filler/elastomer bonding agent(s), all or some of the other constituents and additives commonly used in rubber mixes, such as plasticisers, pigments, antioxidants, antiozone waxes, a cross-linking system based either on sulphur and/or peroxide and/or on bismaleimides, cross-linking accelerators, extender oils, one or more agents for covering the reinforcing inorganic filler, such as alkoxysilanes, polyols, amines, etc . . .

A tyre tread according to the invention, which is usable for reducing the rolling resistance of a tyre incorporating it, is such that it comprises a cross-linked rubber composition such as defined above.

A tyre according to the invention is such that it comprises such a tread.

The aforementioned characteristics of the present invention, as well as others, will be better understood on reading the following description of several examples of embodiment of the invention, which are given by way of illustration and not of limitation.

The SEC technique (size exclusion chromatography) was used to determine the number-average molecular weights of the copolymers obtained. According to this technique, the macromolecules are separated physically according to their respective sizes when swollen, in columns filled with a porous stationary phase.

A chromatograph sold under the name "WATERS" model "150C" is used for the aforementioned separation. A set of two "WATERS" columns is used, the type being "STYRAGEL HT6E".

Furthermore, carbon-13 nuclear magnetic resonance ($^{13}$C-NMR) was used to determine the microstructure characteristics of the elastomers obtained. The details of this characterisation are explained below.

The $^{13}$C-NMR analyses are performed using a "Bruker AM250" spectrometer. The nominal frequency of carbon 13 is 62.9 MHz. To ensure quantitative results, the spectra are recorded without the "nuclear Overhauser effect" (NOE). Spectral width is 240 ppm. The angle pulse used is a 90° pulse the duration of which is 5% μs. Low power decoupling and a wide proton band are used to eliminate scalar $^1$H-$^{13}$C coupling during $^{13}$C acquisition. The sequence repetition time is 4 seconds. The number of transients accumulated to increase the signal/noise ratio is 8192. The spectra are calibrated against the CDCl$_3$ band at 77 ppm.

In the examples, the properties of the compositions of the invention are evaluated as follows:

Mooney viscosity ML (1+4) at 100° C.: measured in accordance with Standard ASTM D 1646 of 1999, abbreviated hereafter to ML;

moduli of elongation at 300% (ME 300), 100% (ME 100) and at 10% (ME 10): measurements taken in accordance with Standard ASTM D 412 of 1998;

Scott break indices: measured at 20° C. in accordance with Standard ASTM D 412 of 1998;

breaking load (BL): measured in MPa in accordance with Standard ASTM D 412 of 1998;

elongation at break (EB) in % in accordance with Standard ASTM D 412 of 1998;

hysteresis losses (HL): measured in % by rebound at 60° C. at the sixth impact, in accordance with the following equation:

$HL(\%)=100\times(W_0-W_1)/W_1$, with $W_0$: energy supplied and $W_1$: energy restored;

SHORE A hardness: measurements taken in accordance with Standard ASTM D 2240 of 1997;

dynamic shear properties (G*):

measurements according to the deformation, performed at 10 Hertz with a peak-to-peak deformation from 0.45% to 50%.

The hysteresis is expressed by the measurement of tan delta at 7% deformation in accordance with Standard ASTM D2231-71 (reapproved in 1977);

specificity of the descriptors in non-filled compositions:

for Example 1 hereafter, the hysteresis descriptor is the value of tan delta which is measured in sinusoidal compression at 10 Hz and at temperatures of 0° C., 20° C. and 50° C.

EXAMPLE 1

Rubber Composition A According to the Invention based on a Copolymer A According to the Invention having Two Blocks SBR and IR, in Comparison with a "Control" Composition B based on a Copolymer SBR B 1) Preparation of the Copolymer A According to the Invention and the "Control" Copolymer B SBR B 1.1) Preparation of the Copolymer A According to the Invention:

Preparation of a Co-catalyst Included in a Catalytic System According to the Invention:

15 ml of cyclohexane, 3.8×10$^{-3}$ mol of barium ethyl diglycolate (component B in solution in cyclohexane) and 13.3×10$^{-3}$ mol of trioctylaluminium (component A in solution in cyclohexane) are introduced into a 0.25 l bottle which is kept under nitrogen. This mixture is stirred for 20 minutes at 40° C., and forms said co-catalyst.

Preparation of the Polymeric Initiator C Formed of a Lithiated Polyisoprene:

154 ml of cyclohexane and 44 ml (30 g) of isoprene are introduced into a 0.25 l bottle which is kept under nitrogen. After neutralisation of the impurities, 3×10$^{-3}$ mol of s-BuLi is added and the polymerisation is effected at 50° C. for 45 minutes. The lithiated polyisoprene of Mn=10,000 g/mol thus obtained is kept under nitrogen at ambient temperature.

Copolymerisation Using the Catalytic System According to the Invention:

Cyclohexane (154 ml), butadiene and stirene are introduced into a 0.25 l bottle which is kept under nitrogen, in the respective weight ratios 1/0.108/0.100. 0.49 ml of said co-catalyst (or 50 μmol of barium equivalent), then 117 μmol of said lithiated polyisoprene is added. The polymerisation is effected at 80° C., and the amount of monomer converted is 65% after 30 min. This amount is determined by weighing an extract dried at 110° C., at the reduced pressure of 200 mmHg. The copolymerisation is stopped with an excess of methanol relative to the lithium. The inherent viscosity measured for the resultant SBR/IR copolymer is 1.61 dl/g and its Mooney viscosity ML(1+4) at 100° C. is 51.

This SBR/IR copolymer is subjected to antioxidant treatment by addition of 0.4 parts per hundred parts of elastomer (phr) of 4,4'-methylene-bis-2,6-tert.butylphenol. This copolymer is recovered by a conventional steam stripping operation, then it is dried in an oven at 50° C. in a current of nitrogen.

The number-average molecular weight of the copolymer A (SBR/IR) obtained, determined by SEC, is 108,000 g/mol.

The microstructure of this copolymer A is determined by $^{13}$C NMR.

The amount of trans-1,4 BR is 77%, the amount of cis-1,4 BR is 19% and the amount of 1,2 BR is 4% (each of these three amounts relates to butadiene units).

The amount of stirene is 30% (by weight).

The amount of 3,4 IR units is 8%, the amount of trans-1,4 IR units is 24% and the amount of cis-1,4 IR units is 68% (each of these three amounts relates to the polyisoprene block).

Finally, the mass fraction of this IR block in this SBR/IR copolymer A (measured by $^{13}$C-NMR) is 8%.

1.2) Preparation of the "Control" SBR Copolymer B:

This "control" SBR B is prepared by copolymerisation of stirene and butadiene carried out in accordance with section 1.1) above, except for the fact that the copolymerisation is initiated by means of n-butyllithium as lithiated initiator, instead of the aforementioned lithiated polyisoprene (the co-catalyst used being the same as previously).

The SBR B obtained is subjected to the aforementioned antioxidant treatment and to the same drying and stripping operations.

The inherent viscosity measured for this SBR B is 1.52 dl/g and its Mooney viscosity ML(1+4) at 100° C. is 49.

The microstructure of this "control" copolymer B is determined by near-infrared spectroscopy. The amount of trans-1,4 BR is 83%, the amount of cis-1,4 BR is 14% and the amount of 1,2 BR is 3% (each of these three amounts relates to butadiene units). The amount of stirene is 30% (by weight).

2) Rubber Composition A According to the Invention based on said SBR/IR Copolymer A, in Comparison with a "Control" Composition B based on the Copolymer SBR B:

The formulation of each composition A, B, devoid of reinforcing filler, is as follows, in phr (parts by weight per hundred parts of elastomer):

| | |
|---|---|
| copolymer A or B | 100 |
| ZnO | 3 |
| stearic acid | 2 |
| sulphur | 1.5 |
| sulphenamide (1) | 1.5 |
| | (N-cyclohexyl-2-benzothiazylsulphenamide). |

Each composition A, B is prepared in an internal mixer by thermomechanical working in one step which takes 5 min. at a blade speed of 50 rpm., until one and the same maximum dropping temperature of 160° C. is achieved, whereas the incorporation of the cross-linking system is carried out on a "homo-finisher" at 30° C.

The cross-linking is carried out at 165° C. for 25 min. The results are set forth in Table 1 below:

TABLE 1

| | Composition | |
|---|---|---|
| | A | B |
| Properties in the vulcanised state: tan delta | | |
| 0° C. | 0.11 | 0.11 |
| 20° C. | 0.08 | 0.10 |
| 50° C. | 0.049 | 0.09 |

As far as the properties in the cross-linked state of these compositions are concerned, it can be deduced from this that, in the field of rolling resistance corresponding to temperatures varying from 20 to 50° C., the levels of dissipation of the composition A according to the invention, based on said copolymer A having SBR/IR blocks, is lowered compared with those obtained with the "control" composition B, based on the "control" copolymer SBR B.

EXAMPLE 2

Rubber Composition A' According to the Invention based on said Copolymer A (SBR/IR), in Comparison with a "Control" Composition B based on said Copolymer SBR B Here two rubber compositions A' and B' were tested which each comprise 65 phr of carbon black of series 300 as reinforcing filler, unlike the non-filled compositions of Example 1.

The formulation of each composition A', B' is as follows (in phr):

| | |
|---|---|
| copolymer A or B | 100 |
| carbon black (series 300) | 65 |
| ZnO | 4 |
| stearic acid | 1 |
| antioxidant (1) | 1.5 |
| paraffin | 1 |
| tackiness resin (2) | 5 |
| antioxidant (3) | 1 |
| sulphur | 1.3 |
| sulphenamide (4) | 1.1 | in which
(1) is N-1,3-dimethylbutyl-N'-phenyl-p-phenylene diamine,
(2) is a tackiness resin sold by EXXON under the name "Escorez 1202",
(3) is tetramethylquinoline, and
(4) is N-cyclohexyl-2-benzothiazylsulphenamide.

Each composition A', B' is prepared in an internal mixer by thermomechanical working in one step which takes 5 min. at a blade speed of 80 rpm., until one and the same maximum dropping temperature of 160° C. is achieved, whereas the incorporation of the cross-linking system is carried out on a "homo-finisher" at 30° C.

The cross-linking is carried out at 150° C. for 20 min. The results are set forth in Table 2 below:

TABLE 2

| | Composition | |
|---|---|---|
| | A | B |
| Properties in the non-vulcanised state | | |
| Mooney | 68 | 66 |
| Properties in the vulcanised state | | |
| ME 10% | 7.84 | 7.37 |
| ME 100% | 2.79 | 2.57 |
| ME 300% | 3.23 | 2.82 |
| SHORE A | 73 | 73 |
| Scott break (MPa) | 20.1 | 17.4 |
| Elongation at break (%) | 454 | 460 |
| Losses at 60° C. (35% deformation) | 39.2 | 45.7 |
| Dynamic properties as a function of deformation: | | |
| G* at 0.45% | 9.93 | 10.33 |
| G* at 50% | 3.48 | 3.56 |
| tan delta at 7% | 0.320 | 0.336 |

As far as the properties in the cross-linked state of these compositions filled with carbon black are concerned, it can be deduced from this that the hysteresis properties (at low and high deformations) of composition A' according to the invention, based on said copolymer A having SBR/IR blocks and on carbon black, are improved compared with those of the "control" composition B' based on said copolymer SBR B and the same carbon black.

It can be deduced from this that the rolling resistance of a tyre the tread of which comprises composition A' according to the invention is reduced compared with that of a tyre the tread of which comprises the "control" composition B'.

EXAMPLE 3

Rubber Composition C According to the Invention based on a Functionalised Copolymer C According to the Invention having Two Blocks SBR and IR, in Comparison with a "Control" Composition D based on a Functionalised SBR D 1) Preparation of the Copolymer C According to the Invention and the "Control" SBR D Copolymer D:

1.1) Preparation of the Functionalised Copolymer C According to the Invention:

This functionalised copolymer C is prepared by copolymerisation of stirene and butadiene carried out in accordance with the process described in section 1.1) of Example 1 above, (i.e. by means of the aforementioned co-catalyst and the initiator constituted by the lithiated polyisoprene), except for the fact that the reaction is stopped with 2 equivalents of 4,4'-bis(N,N-diethylamino)benzophenone relative to the lithium, for the functionalisation.

The copolymer C having SBR/IR blocks which is thus functionalised is subjected to the antioxidant treatment and to the stripping and drying operations mentioned above in Example 1.

The inherent viscosity measured for this copolymer C is 1.51 dl/g and the Mooney viscosity ML(1+4) at 100° C. is approximately 50.

The number-average molecular weight of this copolymer C, determined by SEC, is 103,000 g/mol.

The microstructure of this copolymer C is determined by $^{13}$C NMR.

The amount of trans-1,4 BR is 78%, the amount of cis-1,4 BR is 17% and the amount of 1,2 BR is 5% (each of these three amounts relates to butadiene units).

The amount of stirene is 31% (by weight).

The percentage of 3,4 IR units is 5%, the percentage of trans-1,4 IR units is 23% and the percentage of cis-1,4 IR units is 72% (each of these three amounts relates to the polyisoprene block).

Finally, the mass fraction of the polyisoprene block in the copolymer C (measured by $^{13}$C NMR) is 6%.

The amount of functionalisation, evaluated by $^1$H NMR, is 88%.

1.2) Preparation of the Functionalised "Control" Copolymer SBR D:

This functionalised "control" SBR D is prepared by copolymerisation of stirene and butadiene carried out in accordance with section 1.1) of Example 1 above, except for the fact that the copolymerisation is initiated by means of n-butyllithium as lithiated initiator, instead of the lithiated polyisoprene (the co-catalyst used being the same as previously), and that the reaction is stopped with 2 equivalents of 4,4'-bis(N,N-diethylamino)benzophenone relative to the lithium.

The SBR D thus functionalised is subjected to the aforementioned antioxidant treatment and to the same drying and stripping operations.

The inherent viscosity measured is 1.43 dl/g.

The number-average molecular weight of this SBR D obtained, determined by SEC, is 100,000 g/mol.

The microstructure of this copolymer D is determined by $^{13}$C NMR.

The amount of trans-1,4 BR is 83%, the amount of cis-1,4 BR is 14% and the amount of 1,2 BR is 3%. The amount of stirene is 31% (by weight).

The amount of functionalisation, evaluated by $^1$H NMR, is 66%.

2) Rubber Composition C According to the Invention based on said Functionalised SBR/IR Copolymer C, in Comparison with a "Control" Composition D based on said SBR D Copolymer, which is also Functionalised:

Here two rubber compositions C and D were tested which each comprise 65 phr of carbon black of series 300 as reinforcing filler.

The formulation of each composition C, D is as follows (in phr):

| | |
|---|---|
| copolymer C or D | 100 |
| carbon black (series 300) | 65 |
| ZnO | 4 |
| stearic acid | 1 |
| antioxidant (1) | 1.5 |
| paraffin | 1 |
| tackiness resin (2) | 5 |
| antioxidant (3) | 1 |
| sulphur | 1.3 |
| sulphenamide (4) | 1.1 | in which
(1) is N-1,3-dimethylbutyl-N'-phenyl-p-phenylene diamine, and
(2) is a tackiness resin sold by EXXON under the name "Escorez 1202",
(3) is tetramethylquinoline,
(4) is N-cyclohexyl-2-benzothiazylsulphenamide.

Each composition C, D is prepared in an internal mixer by thermomechanical working in one step which takes 5 min. at a blade speed of 80 rpm., until one and the same maximum dropping temperature of 160° C. is achieved, whereas the incorporation of the cross-linking system is carried out on a "homo-finisher" at 30° C.

The cross-linking is carried out at 150° C. for 20 min. The results are set forth in Table 3 below:

TABLE 3

|  | Composition | |
|---|---|---|
|  | C | D |
| Properties in the non-vulcanised state: | | |
| Mooney | 75 | 72 |
| Properties in the vulcanised state: | | |
| ME 10% | 7.28 | 7.23 |
| ME 100% | 2.80 | 2.6 |
| ME 300% | 3.50 | 3.10 |
| SHORE A | 73 | 73 |
| Scott break (MPa) | 22.7 | 19.1 |
| Elongation at break (%) | 463 | 443 |
| Losses at 60° C. (35% deformation) | 34.6 | 42.4 |
| Dynamic properties as a function of deformation: | | |
| G* at 0.45% | 7.31 | 9.22 |
| G* at 50% | 2.43 | 3.42 |
| tan delta at 7% | 0.280 | 0.319 |

As far as the properties in the cross-linked state of these compositions C and D filled with carbon black are concerned, it can be deduced from this that the hysteresis properties (at low and high deformations) of the composition C according to the invention, based on said functionalised copolymer C having SBR/IR blocks, are improved compared with those of the "control" composition D based on said control copolymer D, which is also functionalised.

It can be deduced from this that the rolling resistance of a tyre the tread of which comprises the composition C according to the invention is reduced compared with that of a tyre the tread of which comprises the "control" composition D.

EXAMPLE 4

Rubber Composition E According to the Invention based on a Star Copolymer E According to the Invention having Two Blocks SBR and IR, in Comparison with a "Control" Composition F based on a Star SBR F 1) Continuous Preparation of a Star Copolymer E having Two Blocks SBR and IR According to the Invention and a Star "Control" SBR Copolymer F:

1.1) Preparation of the Block Copolymer E According to the Invention:

1.1.1) Preparation of a Living Polyisoprene:

The polyisoprene is prepared continuously in a reactor of a capacity of 32.5 l, which is provided with a stirrer of turbine type. There are introduced continuously into this reactor, on one hand, cyclohexane and isoprene in respective weight ratios of 100/20 and, on the other hand, a solution of 12,500 μmol of active sec. butyllithium (s-BuLi) per 100 g of isoprene.

The flow rates of the various solutions are adjusted such that the average dwell time is 40 minutes. The reactor temperature is maintained at 70° C. Monomer conversion is 100% at the reactor outlet.

The residual butyllithium content is determined from a sample by means of an addition product which is obtained with benzophenone and is assayed by gas phase chromatography using an "HP 5890" chromatograph on a "CPSil 19" column (with a retention time of 8 minutes, 20 seconds). This residual BuLi content is thus estimated at 1.2%.

The number-average molecular weight of the living polyisoprene thus obtained, which is determined by osmotic pressure measurement on a sample stopped by one lithium equivalent of methanol, is 8400 g/mol. This osmotic pressure measurement is performed by means of an "Osmomat 090" model osmometer sold under the name "Gonotec".

The glass transition temperature Tg of this polyisoprene is −64° C. and the content of 3,4-linkages is 8%.

The lithiated polyisoprene is stored under nitrogen at a temperature of 10° C. No change in content is observed over several weeks' storage under nitrogen pressure at this temperature.

1.1.2) Continuous Copolymerisation of Butadiene and Stirene Initiated by a Catalytic System Including this Living Polyisoprene:

Cyclohexane, butadiene and stirene are introduced into a 32.5 l reactor in respective mass flow rates 100/12/8.

In parallel, a co-catalyst is prepared which is composed of barium ethyl diglycolate and trioctylaluminium in solution in cyclohexane, in a molar ratio Al/Ba=3.5. The flow rate is regulated such that this co-catalyst joins the flow (solvent+ monomers), upstream of the reactor, such that the quantity of barium corresponds to 240 micromoles per 100 g of monomers.

At the reactor inlet, 600 micromoles per 100 g of monomers of the solution of the living polyisoprene described in section 1.1.1) is injected.

The various flow rates are adjusted such that the average dwell time in the reactor is 40 minutes. The temperature is maintained at 95° C.

The conversion rate, which is measured on a sample taken at the reactor outlet, is 65%, while the inherent viscosity, which is measured at 0.1 g/dl in toluene, is 1.63 dl/g.

Finally, at the reactor outlet, 96 micromoles per 100 g of tris-(nonylphenol)phosphite monomers in solution in cyclohexane is added to the solution of living polymer (on a static in-line mixer). After 3 minutes of this starring reaction, 1440 micromoles per 100 g of monomers of methanol is injected and the copolymer is subjected to antioxidant treatment, using 0.8 phr of 2,2'-methylene-bis(4-methyl-6-tert. butylphenol) and 0.2 phr of N-(1,3-dimethylbutyl)-N'-phenyl-p-phenylenediamine.

The copolymer thus treated is separated from its solution by a steam stripping operation, then it is dried on an open mill at 100° C. for 20 min, in order to obtain the star copolymer E having SBR/IR blocks according to the invention.

The inherent viscosity of this copolymer E is 1.87 dl/g, and its viscosity ML(1+4) at 100° C. is 55.

The number-average molecular weight of the copolymer, determined by SEC, is 80,000 g/mol.

The microstructure of this copolymer E is determined by $^{13}$C NMR.

The SBR block of this copolymer E contains 31% stirene (by weight) and, for its butadiene part, 77% of trans-1,4 units. The mass fraction of the polyisoprene block in this copolymer E (measured by $^{13}$C-NMR) is 7%. This polyisoprene block comprises 8% of 3,4 units, 24% of trans-1,4 units and 68% of cis-1,4 units.

1.2) Preparation of the "Control" Star Copolymer F:

This star SBR F is prepared by copolymerisation of stirene and butadiene using the method described in the preceding section 1.1.2), except for the fact that the quantity of barium ethyl diglycolate is 525 micromoles per 100 g of monomers (the ratio Al/Ba always being 3.5) and that the 600 micromoles per 100 g of monomers of living polyisoprene are replaced by 1100 μmol/100 g of active n-BuLi monomers, for the initiation of this copolymerisatiori.

The amount of conversion on emerging from the reactor is 68%, and the inherent viscosity of the SBR obtained, before the addition of 210 micromoles per 100 g of tris-(nonylphenol)phosphite monomers, is 1.44 dl/g.

After this starring, the SBR is subjected to the aforementioned antioxidant treatment and to said drying and stripping operations.

The inherent viscosity of the resultant copolymer F is 1.79 dl/g and its ML viscosity is 55.

The number-average molecular weight of the copolymer, determined by SEC, is 71,000 g/mol.

The microstructure of this copolymer F is identical to the one mentioned above for the SBR block of said copolymer E.

2) Rubber Composition E According to the Invention based on said Star SBR/IR Copolymer E, in Comparison with a "Control" Composition F based on said Star Copolymer SBR F:

Here two rubber compositions E and F were tested which each comprise 54 phr of carbon black of series 200 as reinforcing filler.

The formulation of each composition E, F is as follows (in phr):

| | |
|---|---|
| star copolymer E or F | 100 |
| carbon black (series 200) | 54 |
| ZnO | 3 |
| stearic acid | 1.5 |
| antioxidant (1) | 2 |
| paraffin | 1 |
| sulphur | 1.4 |
| sulphenamide (2) | 1.4 | in which
(1) is N-1,3-dimethylbutyl-N'-phenyl-p-phenylenediamine,
(2) is N-cyclohexyl-2-benzothiazylsulphenamide.

Each composition E, F is prepared in an internal mixer by thermomechanical working in one step which takes 5 min. at a blade speed of 80 rpm., until one and the same maximum dropping temperature of 160° C. is achieved, whereas the incorporation of the cross-linking system is carried out on a "homo-finisher" at 30° C.

The cross-linking is carried out at 150° C. for 20 min. The results are set forth in Table 4 below:

TABLE 4

| | Composition | |
|---|---|---|
| | E | F |
| Properties in the non-vulcanised state: | | |
| Mooney | 89 | 87 |
| Properties in the vulcanised state: | | |
| ME 10% | 5.15 | 4.89 |
| ME 100% | 2.11 | 1.97 |
| ME 300% | 3.55 | 3.19 |

TABLE 4-continued

| | Composition | |
|---|---|---|
| | E | F |
| SHORE A | 65 | 64 |
| Scott break (MPa) | 27 | 28 |
| Elongation at break (%) | 421 | 494 |
| Losses at 60° C. (35% deformation) | 32.4 | 37.0 |
| Dynamic properties as a function of deformation: | | |
| G* at 0.45% | 3.50 | 3.06 |
| G* at 50% | 1.75 | 1.60 |
| tan delta at 7% | 0.201 | 0.224 |

As far as the properties in the cross-linked state of these compositions E and F filled with carbon black are concerned, it can be deduced from this that the hysteresis properties (at low and high deformations) of the composition E according to the invention, based on said star copolymer E having SBR/IR blocks and on carbon black, are improved compared with those of the "control" composition F based on said star copolymer SBR F and the same carbon black.

It can be deduced from this that the rolling resistance of a tyre the tread of which comprises the composition E according to the invention is lowered compared with that of a tyre the tread of which comprises the "control" composition F.

EXAMPLE 5

Rubber Composition G According to the Invention based on a Linear Copolymer G According to the Invention having Two Blocks SBR and IR, in Comparison with a "Control" Composition H based on a Linear SBR H 1) Continuous Preparation of a Linear Copolymer G having Two Blocks SBR and IR According to the Invention and a Linear "Control" SBR Copolymer H:

1.1) Preparation of the Block Copolymer G According to the Invention:

This linear copolymer G is prepared using the method described in section 1.1.2) of Example 4 for said copolymer E, except for the fact that:

the quantity of barium ethyl diglycolate here is 230 micromoles per 100 g of monomers (the ratio Al/Ba always being 3.5);

the added quantity of living polyisoprene (prepared in accordance with the procedure described in 1.1.1) of Example 4 here is 480 micromoles per 100 g of monomers; and that 1380 micromoles per 100 g of monomers of methanol are added on emerging from the reactor to stop the reaction and thus obtain a linear polymer.

The amount of conversion at the reactor outlet is 60%, the number-average molecular weight of the block copolymer G (linear SBR/IR) obtained is 99,000 g/mol and its inherent viscosity is 1.93 dl/g.

As in the preceding examples, the copolymer obtained is subjected to the aforementioned antioxidant treatment and to said drying and stripping operations.

The viscosity ML(1+4) at 100° C. of the copolymer G thus obtained is 56.

The microstructure of this copolymer G is identical to the one mentioned above for the SBR block of said copolymer E. Thus, the mass fraction of the polyisoprene block in this copolymer G (measured by $^{13}C$ NMR) is 7%.

1.2) Preparation of the Control Linear SBR Copolymer H:

This linear copolymer H is prepared using the method described in section 1.1) of this Example 5 for said copolymer G, except for the fact that:

the quantity of barium ethyl diglycolate here is 365 micromoles per 100 g of monomers (the ratio Al/Ba always being 3.5);

the living polyisoprene is here replaced by a quantity of n-butyllithium of 770 micromoles per 100 g of monomers; and that 2200 micromoles per 100 g of monomers of methanol are added at the reactor outlet to stop the reaction and thus obtain a linear polymer.

The amount of conversion at the reactor outlet is 68%, and the inherent viscosity of the copolymer H having SBR/IR blocks obtained is 1.83 dl/g. The number-average molecular weight of this copolymer H is 83,000 g/mol.

As in the preceding examples, the copolymer obtained is subjected to the aforementioned antioxidant treatment and to the same drying and stripping operations.

The viscosity ML(1+4) at 100° C. of the copolymer H thus obtained is 55.

The microstructure of this copolymer H (measured by $^{13}C$ NMR) is identical to the one mentioned above for the SBR block of said copolymer E of Example 4.

2) Rubber Composition G According to the Invention based on said Linear SBR/IR Copolymer G, in Comparison with a "Control" Composition H based on said Linear Copolymer SBR H:

Here two rubber compositions G and H were tested which each comprise 54 phr of carbon black of series 200 as reinforcing filler.

The formulation of each composition G, H is as follows (in phr):

| | |
|---|---|
| copolymer G or H | 100 |
| carbon black (series 200) | 54 |
| ZnO | 3 |
| stearic acid | 1.5 |
| antioxidant (1) | 2 |
| paraffin | 1 |
| sulphur | 1.4 |
| sulphenamide (2) | 1.4 | in which
(1) is N-1,3-dimethylbutyl-N'-phenyl-p-phenylenediamine,
(2) is N-cyclohexyl-2-benzothiazylsulphenamide.

Each composition G, H is prepared in an internal mixer by thermomechanical working in one step which takes 5 min. at a blade speed of 80 rpm., until one and the same maximum dropping temperature of 160° C. is achieved, whereas the incorporation of the cross-linking system is carried out on a "homo-finisher" at 30° C.

The cross-linking is carried out at 150° C. for 20 min.
The results are set forth in Table 5 below.

TABLE 5

| | Composition | |
|---|---|---|
| | G | H |
| Properties in the non-vulcanised state | | |
| Mooney | 96 | 92 |
| Properties in the vulcanised state: | | |
| ME 10% | 5.74 | 5.32 |
| ME 100% | 2.27 | 2.13 |
| ME 300% | 3.58 | 3.38 |

TABLE 5-continued

| | Composition | |
|---|---|---|
| | G | H |
| SHORE A | 67 | 66 |
| Scott break (MPa) | 31 | 29 |
| Elongation at break (%) | 472 | 464 |
| Losses at 60° C. (35% deformation) | 31.2 | 35.4 |
| Dynamic properties as a function of deformation: | | |
| G* at 0.45% | 3.57 | 3.74 |
| G* at 50% | 1.83 | 1.83 |
| tan delta at 7% | 0.189 | 0.209 |

As far as the properties in the cross-linked state of these compositions G and H filled with carbon black are concerned, it can be deduced from this that the hysteresis properties (at low and high deformations) of the composition G according to the invention, based on said linear copolymer G having SBR/IR blocks and on carbon black, are improved compared with those of the "control" composition H based on said linear copolymer SBR H and the same carbon black.

It can be deduced from this that the rolling resistance of a tyre the tread of which comprises the composition G according to the invention is reduced compared with that of a tyre the tread of which comprises the "control" composition H.

The invention claimed is:

1. A preparation process for a copolymer, whether functional or not, having two blocks, which is usable in a sulphur-cross-linkable rubber composition of reduced hysteresis in the cross-linked state, one of said blocks being constituted of a polyisoprene and the other of a diene elastomer other than a polyisoprene, the molar ratio of units originating from conjugated dienes of which is greater than 15%, said process comprising copolymerizing one or more monomers comprising a conjugated diene other than isoprene using a catalytic system comprising at least one hydrocarbon solvent, a compound A of a metal of group IIIA, a compound B of an alkaline-earth metal and a polymeric initiator C comprising a C—Li bond which is constituted of a monolithiated polyisoprene intended to form said polyisoprene block, the number-average molecular weight $M_{n1}$ of said polyisoprene block being between 2,500 and 20,000 g/mol, in order to obtain said copolymer in which the block comprising said diene elastomer has a number-average molecular weight $M_{n2}$ of between 65,000 and 350,000 g/mol and a content of trans-1,4 linkages equal to or greater than 70%.

2. A process according to claim 1 for the preparation of a copolymer having two blocks, wherein the ratio of said number-average molecular weights $M_{n1}/M_{n2}$ is between 5 and 20%.

3. A process according to claim 1 for the preparation of a copolymer having two blocks, wherein said catalytic system comprises a co-catalyst, resulting from the reaction product in said hydrocarbon solvent of said compound A and said compound B, and said polymeric initiator C.

4. A process according to claim 3 for the preparation of a copolymer having two blocks, comprising:

in a first step, of preparing said co-catalyst by reacting said metallic compounds A and B with each other in said hydrocarbon solvent, then in a second step, of contacting said co-catalyst with the polymerisation medium comprising said monomer(s) to be copolymerised dissolved in a polymerisation solvent, with the exclusion of said polymeric initiator C, then in a third step, of reacting the mixture obtained in said second step by means of said polymeric initiator C, and later stopping the polymerisation reaction in order to obtain said copolymer, whether functional or not.

5. A process according to claim 3 for the preparation of a copolymer having two blocks, comprising:

in a first step, of preparing said co-catalyst by reacting said metallic compounds A and B with each other in said hydrocarbon solvent, then in a second step, of adding said polymeric initiator C to the co-catalyst obtained in the first step, then in a third step, adding the catalytic system thus obtained to the polymerisation medium comprising said monomer(s) to be copolymerised in solution in a polymerisation solvent, and later stopping the polymerisation reaction in order to obtain said copolymer, whether functional or not.

6. A process according to claim 1 for the preparation of a copolymer having two blocks, comprising:

in a first step, of pre-mixing said compounds A and C in said hydrocarbon solvent, then in a second step, of adding said pre-mixture to the polymerisation medium comprising said monomer(s) to be copolymerised dissolved in a polymerisation solvent, then in a third step, of adding said compound B to the mixture obtained in said second step, and later stopping the polymerisation reaction in order to obtain said copolymer, whether functional or not.

7. A process according to claim 1 for the preparation of a copolymer having two blocks, wherein said compound A is a trialkylaluminum, the number of carbon atoms of which varies from 1 to 12.

8. A process according to claim 1 for the preparation of a copolymer having two blocks, wherein said compound B is a barium, strontium or calcium alcoholate.

9. A process according to claim 4 for the preparation of a copolymer having two blocks, wherein said first step of reacting said compounds A and B in said hydrocarbon solvent, the molar ratio of A/B is between 0.5 and 5, and heating is conducted at a temperature of between 20° C. and 120° C.

10. A process according to claim 1 for the preparation of a copolymer having two blocks, wherein said hydrocarbon solvent consists of toluene and/or cyclohexane.

11. A process according to claim 1 for the preparation of a copolymer having two blocks, wherein a molar ratio of (compound C/compound B) which is between 0.2 and 4.

12. A process according to claim 1 for the preparation of a copolymer having two blocks, wherein said diene elastomer constituting said block other than a polyisoprene is a stirene/butadiene copolymer.

13. A process according to claim 7 for the preparation of a copolymer having two blocks, wherein compound A is a trioctylaluminium.

14. A process according to claim 8 for the preparation of a copolymer having two blocks, wherein compound B is a barium ethyl diglycolate or nonylphenoxide.

15. A copolymer, whether functional or not, having two blocks, capable of being obtained by a process according to claim 1, said copolymer being usable in a sulphur-cross-linkable rubber composition of reduced hysteresis, one of said blocks being constituted of a polyisoprene and the other of a diene elastomer other than a polyisoprene, the molar ratio of units originating from conjugated dienes of which is greater than 15%, wherein the block constituted of said diene elastomer has a content of trans-1,4 linkages which is equal to or greater than 70%, the number-average molecular weight $M_{n1}$ of the polyisoprene block is of between 2,500 and 20,000 g/mol, and the number-average molecular weight $M_{n2}$ of the block made from said diene elastomer is between 65,000 and 350,000 g/mol.

16. A copolymer having two blocks according to claim 15, wherein the ratio of said number-average molecular weights $M_{n1}/M_{n2}$ is between 5 and 20%.

17. A copolymer having two blocks according to claim 15, wherein the block which is formed of said diene elastomer comprises a function which is capable of interacting with a reinforcing filler.

18. A copolymer having two blocks according to claim 17, wherein said function is capable of interacting with carbon black.

19. A copolymer having two blocks according to claim 17, wherein said function is capable of interacting with a reinforcing inorganic filler.

20. A copolymer having two blocks according to claim 15 wherein said polyisoprene block has a content of 3,4 and 1,2 vinyl linkages which is between 1 and 20%.

21. A copolymer having two blocks according to claim 15 wherein said diene elastomer constituting said block other than a polyisoprene is a stirene/butadiene copolymer.

22. A copolymer having two blocks according to claim 18, wherein said function capable of interacting with carbon black is an amine function.

23. A copolymer having two blocks according to claim 19, wherein said function capable of interacting with a reinforcing inorganic filler is a silanol group or an alkoxysilane group.

24. A copolymer having two blocks according to claim 23, wherein said reinforcing inorganic filler is silica.

25. A cross-linkable or cross-linked rubber composition, having a reduced hysteresis in the cross-linked state and usable in a tire tread, said composition comprising a reinforcing filler and a copolymer having two blocks according to claim 15, the block of said copolymer which is constituted of said diene elastomer other than a polyisoprene being optionally functionalised, coupled or starred for bonding with said reinforcing filler.

26. A rubber composition according to claim 25, wherein said reinforcing filler comprises a majority portion of carbon black.

27. A rubber composition according to claim 25, wherein said reinforcing filler comprises a majority portion of a reinforcing inorganic filler.

28. A tire tread usable for reducing the rolling resistance of a tire incorporating same, said tire tread comprising a rubber composition according to claim 25.

29. A tire, which comprises a tread according to claim 28.

30. A rubber composition according to claim 27, wherein said reinforcing inorganic filler is silica.

* * * * *